(12) United States Patent
Yamaguchi et al.

(10) Patent No.: US 10,406,905 B2
(45) Date of Patent: Sep. 10, 2019

(54) ACTIVE VIBRATION DAMPING DEVICE

(71) Applicant: HONDA MOTOR CO., LTD,
Minato-ku, Tokyo (JP)

(72) Inventors: Takashi Yamaguchi, Wako (JP);
Tatsuhiro Yone, Torrance, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 24 days.

(21) Appl. No.: 15/712,598

(22) Filed: Sep. 22, 2017

(65) Prior Publication Data

US 2018/0086194 A1 Mar. 29, 2018

(30) Foreign Application Priority Data

Sep. 28, 2016 (JP) ................. 2016-189070

(51) Int. Cl.
*B60K 5/12* (2006.01)
*F16F 15/00* (2006.01)

(52) U.S. Cl.
CPC .......... *B60K 5/1283* (2013.01); *F16F 15/002* (2013.01)

(58) Field of Classification Search
CPC ............................ B60K 5/1283; F16F 15/002
USPC .......................................................... 701/36
See application file for complete search history.

(56) References Cited

U.S. PATENT DOCUMENTS

| 9,677,479 | B2* | 6/2017 | Boyer ................... F02B 75/20 |
| 2004/0258251 | A1* | 12/2004 | Inoue .................. G10K 11/178 |
| | | | 381/71.4 |
| 2012/0032617 | A1 | 2/2012 | Kobayashi et al. |
| 2014/0249733 | A1* | 9/2014 | Ishiguro ............... B60K 5/1283 |
| | | | 701/111 |
| 2015/0001773 | A1* | 1/2015 | Inoue ................... F16F 7/1011 |
| | | | 267/140.15 |
| 2016/0102620 | A1* | 4/2016 | Ervin .................. F02D 41/0087 |
| | | | 123/345 |

FOREIGN PATENT DOCUMENTS

| JP | 2000-002292 | 1/2000 |
| JP | 2003-113892 | 4/2003 |
| JP | 2007-107579 | 4/2007 |
| JP | 2012-36975 | 2/2012 |

OTHER PUBLICATIONS

Japanese Office Action for Japanese Patent Application No. 2016-189070 dated Apr. 10, 2018.

* cited by examiner

*Primary Examiner* — Krishnan Ramesh
(74) *Attorney, Agent, or Firm* — Amin, Turocy & Watson LLP

(57) ABSTRACT

In the case that an all-cylinder operational state is detected by an ENG vibration pattern determining function, an ACM-ECU executes an amplitude variable—phase fixed control. Further, in the case that a cylinder paused operational state is detected by the ENG vibration pattern determining function, the ACM-ECU executes an amplitude variable—phase variable control exhibiting a large vibration damping effect.

8 Claims, 12 Drawing Sheets

ACTIVE VIBRATION DAMPING DEVICE

CROSS-REFERENCE TO RELATED APPLICATION

This application is based upon and claims the benefit of priority from Japanese Patent Application No. 2016-189070 filed on Sep. 28, 2016, the contents of which are incorporated herein by reference.

BACKGROUND OF THE INVENTION

Field of the Invention

The present invention relates to an active vibration damping device equipped with an engine mount interposed between a vehicle body and a multi-cylinder internal combustion engine mounted in the vehicle, and which is adapted to suppress vibrations transmitted from a side of the internal combustion engine to a side of the vehicle body, by active vibrations generated by actuators of the engine mount.

Description of the Related Art

Vibrations generated in an internal combustion engine (hereinafter also referred to as an "engine") propagate to the vehicle cabin through (a sub-frame and/or a main frame of) the vehicle body. As pathways of the vibrations that are propagated from the engine to the vehicle cabin, there are generally cited a pathway (hereinafter referred to as a "mounting system path") in which vibrations are propagated from the engine to the vehicle body via the engine mount, and a pathway (hereinafter referred to as a "drive system path") in which vibrations are propagated from an output shaft of the engine, through a suspension or the like, and to the vehicle body.

A vibration damping device is provided in the vehicle in order to suppress vibrations that are propagated through the mounting system path. As such a vibration damping device, a liquid sealed mount comprising a liquid chamber filled with a liquid, and an active control mount (hereinafter referred to as an "ACM") in which a liquid sealed mount and an actuator are provided in an integrated manner, etc., are known. In the present specification, devices related to vibration damping, such as an ACM and a control device therefor (ACM-ECU) or the like, are referred to collectively as active vibration damping devices.

Japanese Laid-Open Patent Publication No. 2012-036975 discloses a device in which a liquid sealed mount and an actuator are disposed separately. In such a damping device, a bias current is supplied to a solenoid in order to maintain a movable element of the actuator at a neutral position. Incidentally, the vibration characteristics change when an operational state of the engine is switched from an all-cylinder operational state in which combustion takes place in all of the cylinders to a cylinder paused operational state in which combustion is paused in a portion of the cylinders. For this reason, the vibration damping device of Japanese Laid-Open Patent Publication No. 2012-036975 sets or releases the bias current in accordance with the operational state of the engine.

SUMMARY OF THE INVENTION

In accordance with an ACM, even if vibrations increase as a result of switching the operational state of the engine, vibrations that are propagated through the mounting system path can be suppressed to a certain extent by implementing a control such as increasing the amplitude of the actuator or the like.

Incidentally, when the operational state of the engine is switched, vibrations that propagate through the drive system path also tend to increase. Conventionally, propagation of vibrations has been suppressed by using a technique such as setting the engagement rate of a lock-up clutch to be not 100%, but on the order of 96% to 97%. However, in order to enhance the power transmission rate of the engine, it is preferable for the engagement rate of the lock-up clutch to be close to 100%. In this case, vibrations transmitted to the vehicle body through the drive system path also increase. Upon doing so, there is a concern that vibrations cannot be sufficiently suppressed merely by a control such as increasing the amplitude of the actuator, as in the conventional technique.

The present invention has been devised in consideration of the aforementioned problems, and an object of the present invention is to provide an active vibration damping device in which, in a vehicle in which an operational state of the engine is switched from an all-cylinder operational state to a cylinder paused operational state, it is possible to suitably suppress vibrations that are propagated from the engine to the vehicle cabin.

A first aspect of the present invention is characterized by an active vibration damping device equipped with an engine mount interposed between a vehicle body and a multi-cylinder internal combustion engine mounted in the vehicle, and which is adapted to suppress vibrations transmitted from a side of the internal combustion engine to a side of the vehicle body, by active vibrations generated by an actuator of the engine mount, comprising a vibration control unit adapted to control the active vibrations generated by the actuator on the basis of rotation information of the internal combustion engine, wherein the vibration control unit includes an operational state detection unit adapted to detect whether an operational state of the internal combustion engine is an all-cylinder operational state in which combustion takes place in all of the cylinders, or a cylinder paused operational state in which combustion is paused in a portion of the cylinders. Further, the vibration control unit executes an amplitude variable—phase fixed control for variably controlling the amplitude of the active vibrations generated by the actuator according to the rotation information, together with fixedly controlling the phase of the active vibrations generated by the actuator, in the case that the all-cylinder operational state is detected by the operational state detection unit. Moreover, the vibration control unit executes an amplitude variable—phase variable control for variably controlling the amplitude and phase of the active vibrations generated by the actuator according to the rotation information, in the case that the cylinder paused operational state is detected by the operational state detection unit.

In the first aspect of the invention, the amplitude variable—phase fixed control is executed in the case that the operational state of the internal combustion engine is the all-cylinder operational state, and the amplitude variable—phase variable control is executed in the case that the operational state of the internal combustion engine is the cylinder paused operational state. At a time of the cylinder paused operational state in which vibrations are increased more than in the all-cylinder operational state, vibrations that are propagated from the internal combustion engine to the vehicle cabin can suitably be suppressed by executing the amplitude variable—phase variable control in which the vibration suppressing effect is large.

The vibration control unit may include a vibration estimation unit adapted to estimate a vibration value of the internal combustion engine on the basis of the rotation information from the internal combustion engine, and may prohibit the amplitude variable—phase variable control, in the case that the vibration value estimated by the vibration estimation unit is greater than or equal to a predetermined vibration value.

If vibrations of the internal combustion engine are too large, cases occur in which, even if the amplitude variable—phase variable control is performed, vibrations that propagate from the internal combustion engine to the vehicle cabin cannot be suitably suppressed. At this time, the arithmetic processing load can be reduced by prohibiting the amplitude variable—phase variable control. Further, since supply of electrical power that does not contribute to suppressing vibrations is halted, the power consumption of the actuator can be reduced.

The vibration control unit may set a first time interval, which is required for switching from the amplitude variable—phase fixed control to the amplitude variable—phase variable control, to be longer than a second time interval, which is required for switching from the amplitude variable—phase variable control to the amplitude variable—phase fixed control.

Comparing the amplitude variable—phase fixed control and the amplitude variable—phase variable control, the amplitude variable—phase fixed control tends to be more stable. In such a case, if switching is carried out quickly from the amplitude variable—phase fixed control to the amplitude variable—phase variable control, there is a concern that the control may become unstable. Therefore, by making the first time interval longer than the second time interval and thereby gradually switching between the controls, it is possible to prevent the control from becoming unstable. Further, by making the second time interval shorter than the first time interval, switching between the controls can be performed quickly.

The vibration control unit may include a failure detection unit adapted to detect at least one failure of auxiliary equipment by the internal combustion engine, and may prohibit the amplitude variable—phase variable control, in the case that a failure of the auxiliary equipment is detected by the failure detection unit.

If auxiliary equipment driven by the internal combustion engine fails, the vibration characteristics may change. In the case that the vibration characteristics are changed, there is a concern that, contrary to expectations, vibrations may actually increase if the amplitude variable—phase variable control were executed. At this time, by prohibiting the amplitude variable—phase variable control, it is possible to prevent the vibrations from increasing.

The vibration control unit may include a failure detection unit adapted to detect a failure of the actuator, and may prohibit the amplitude variable—phase variable control, in the case that a failure of the actuator is detected by the failure detection unit.

In the case there is a failure of the actuator of the engine mount, the amplitude variable—phase variable control cannot be executed. At this time, by prohibiting the amplitude variable—phase variable control, there is no need to execute arithmetic processing or the like for the amplitude variable—phase variable control. Therefore, the arithmetic processing load can be reduced. Further, since supply of electrical power that does not contribute to suppressing vibrations is halted, the power consumption of the actuator can be reduced.

The vehicle body may be constituted to include a main frame and a sub-frame, wherein the engine mount is fixed to the sub-frame. In this case, during the amplitude variable—phase fixed control, the vibration control unit may operate the engine mount so as to suppress vibrations at a connection point between the engine mount and the sub-frame, and during the amplitude variable—phase variable control, the vibration control unit may operate the engine mount so as to suppress vibrations at a connection point between the sub-frame and the main frame, or vibrations at a connection point between a suspension of the vehicle and the main frame.

A second aspect of the present invention is characterized by an active vibration damping device equipped with first and second engine mounts interposed between a vehicle body and a multi-cylinder internal combustion engine mounted in the vehicle, and which is adapted to suppress vibrations transmitted from a side of the internal combustion engine to a side of the vehicle body, by active vibrations generated by a first actuator of the first engine mount and a second actuator of the second engine mount, comprising a vibration control unit adapted to control the active vibrations generated by the first actuator and the second actuator on the basis of rotation information of the internal combustion engine, wherein the vibration control unit includes an operational state detection unit adapted to detect whether an operational state of the internal combustion engine is an all-cylinder operational state in which combustion takes place in all of the cylinders, or a cylinder paused operational state in which combustion is paused in a portion of the cylinders. Further, the vibration control unit executes an amplitude variable—phase fixed control for variably controlling a first amplitude of the active vibrations generated by the first actuator, and a second amplitude of the active vibrations generated by the second actuator, respectively, according to the rotation information, together with fixedly controlling a first phase of the active vibrations generated by the first actuator, and a second phase of the active vibrations generated by the second actuator, respectively, in the case that the all-cylinder operational state is detected by the operational state detection unit. Moreover, the vibration control unit executes an amplitude variable—phase variable control for variably controlling the first amplitude and the first phase of the active vibrations generated by the first actuator, and the second amplitude and the second phase of the active vibrations generated by the second actuator, respectively, according to the rotation information, in the case that the cylinder paused operational state is detected by the operational state detection unit. According to the second aspect of the present invention, since the two engine mounts operate in coordination with each other, vibrations can be suppressed with higher precision than in the first aspect of the invention.

The vibration control unit may include a failure detection unit adapted to detect at least one failure of the first actuator and the second actuator, and may prohibit the amplitude variable—phase variable control, in the case that a failure of the first actuator and/or the second actuator is detected by the failure detection unit.

According to the present invention, at a time of the cylinder paused operational state in which vibrations are increased more than in the all-cylinder operational state, vibrations that are propagated from the internal combustion engine to the vehicle cabin can suitably be suppressed by executing the amplitude variable—phase variable control in which the vibration suppressing effect is large.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

Preferred embodiments of an active vibration damping device according to the present invention will be described in detail below with reference to the accompanying drawings.

1. First Embodiment 1.1 Vehicle 10

Figure 1:
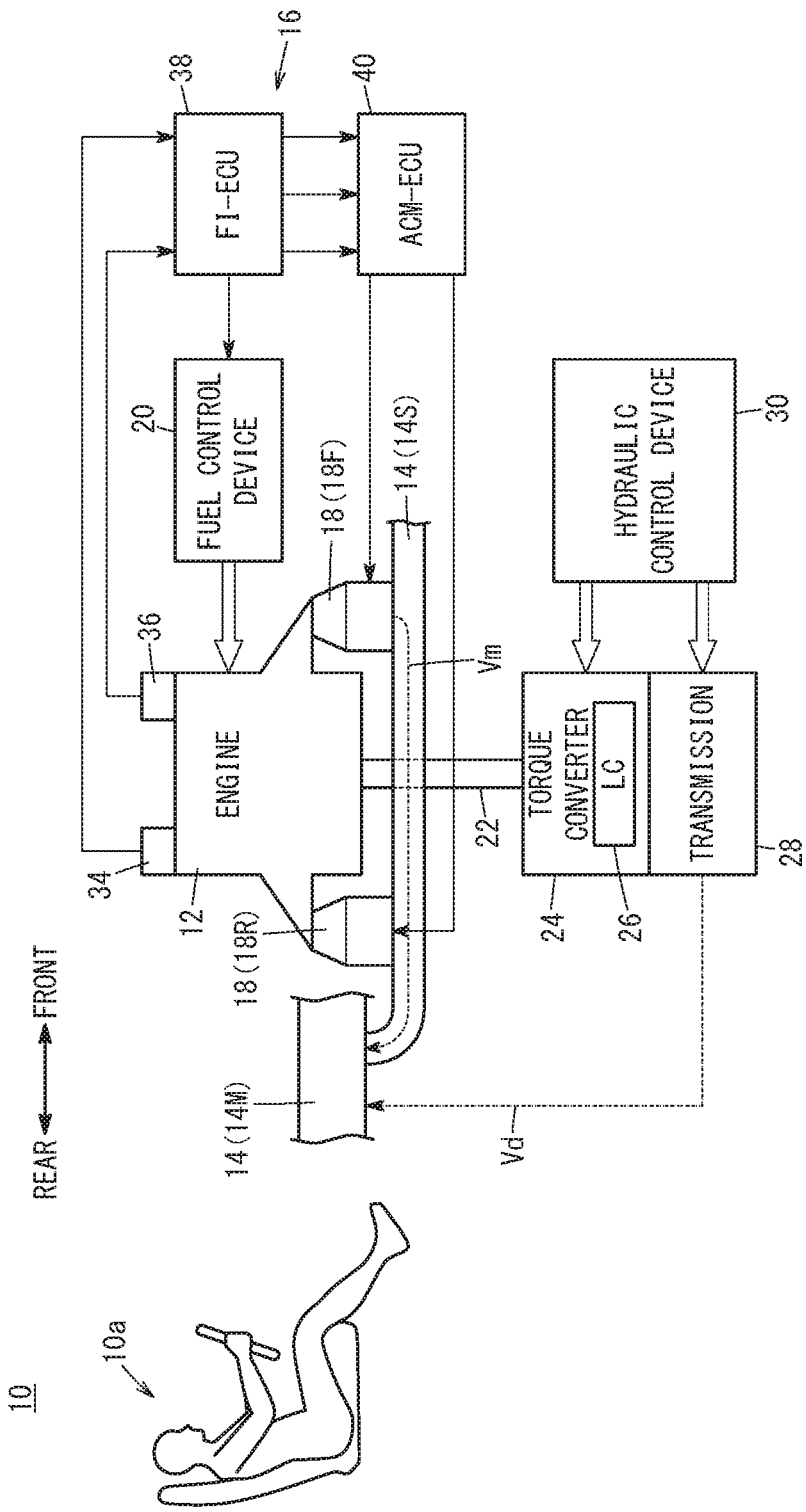
FIG. 1 is a configuration diagram of a vehicle equipped with an active vibration damping device according to a first embodiment.

A vehicle 10 will be described with reference to FIG. 1. The vehicle 10 includes an active vibration damping device 16 that suppresses vibrations that propagate from an engine 12 to a vehicle cabin 10a via (a sub-frame 14S and/or a main frame 14M of) a vehicle body 14. The vehicle 10 is an engine-equipped vehicle in which the engine 12 is mounted as a drive source used for traveling, or a hybrid vehicle in which there is mounted a hybrid power plant including the engine 12 and an electric motor (not shown).

The engine 12 is a multi-cylinder internal combustion engine, which is capable of switching between an all-cylinder operational state and a cylinder paused operational state. The engine 12 is fixed to the sub-frame 14S via a plurality of ACMs (active control mounts) 18. According to the present embodiment, a front-side ACM 18F (hereinafter also referred to as an "ACM-Fr 18F") is disposed on a front part of the engine 12, and a rear-side ACM 18R (hereinafter also referred to as an "ACM-Rr 18R") is disposed on a rear part of the engine 12. Moreover, instead of providing a plurality of ACMs 18, a single ACM 18 may be provided. Further, apart from the ACMs 18 themselves, other types of mounts may be provided. A mounting system path is formed by a mounting system mechanism of the ACMs 18, and the vehicle body 14. Vibrations Vm of the engine 12 are propagated to the mounting system path.

In the engine 12, fuel supplied from a fuel control device 20 undergoes combustion, and an output shaft 22 of the engine is rotated. The output shaft 22 is connected to the drive wheels (not shown) via a torque converter 24 having a lock-up clutch 26 (hereinafter also referred to as an "LC 26"), a transmission 28, and a drive shaft (not shown). An engagement rate Lr of the LC 26 and a gear stage of the transmission 28 are changed in accordance with a hydraulic oil supplied from a hydraulic control device 30. A suspension (not shown) is interposed between the drive wheels and the vehicle body 14. A drive system path is formed by the vehicle body 14 and a mechanism of the drive system from the output shaft 22 to the suspension. Vibrations Vd of the engine 12 are propagated to the drive system path.

1.2 Configuration of Active Vibration Damping Device 16

The configuration of the active vibration damping device 16 will be described with reference to FIG. 2. The active vibration damping device 16 includes the ACMs 18, a TDC sensor 34, a CRK sensor 36, a fuel injection ECU 38 (hereinafter referred to as an "FI-ECU 38"), and an ACM-ECU 40.

The ACMs 18 are composed of an ACM-Fr 18F and an ACM-Rr 18R, as described above. For the ACMs 18, devices known in the art, for example, the devices disclosed in Japanese Laid-Open Patent Publication No. 2007-107579 or the like can be used. The ACMs 18 each include a liquid chamber and a linear actuator (neither of which is shown). The actuator includes a stationary element, a movable element, and a solenoid. The movable element is vibrated in accordance with drive signals output from the ACM-ECU 40. In the present specification, vibrations generated by the actuators of the ACMs 18 are referred to as active vibrations. The amplitude, period, and phase of the active vibrations are adjusted in accordance with the periodic oscillation of the engine 12.

The ACM-ECU 40 is a computational device containing a microcomputer, and further includes an input/output unit 42 equipped with an A/D converter, a D/A converter, and various circuitry, etc., a processing unit 44 comprising a CPU, and a storage unit 46 comprising a flash memory, an EEPROM, an SRAM, or the like. The CPU of the processing unit 44 executes various programs, and realizes respective functions, which will be described below in item [1.3]. The ACM-ECU 40 may be constituted by a single ECU, or may be constituted by a plurality of ECUs.

The TDC sensor 34 detects when the pistons (not shown) of the engine 12 have reached a top dead center position (top dead center timing), and with each detection thereof, generates a TDC pulse, which is output to the FI-ECU 38. In the case that each of the cylinders is operating, an interval between the TDC pulses is indicative of the interval at which the respective cylinders of the engine 12 are located at their top dead center positions, that is, the interval between explosive processes taking place in the cylinders. The CRK sensor 36 detects when the crankshaft (not shown) of the engine 12 has been rotated by a predetermined angle (crank angle), and with each detection thereof, generates a rotary CRK pulse, which is output to the FI-ECU 38. Moreover, the TDC pulses and the CRK pulses may be output directly to the ACM-ECU 40.

The FI-ECU 38 is of the same configuration as the ACM-ECU 40. In addition to the TDC pulses and the CRK pulses, the FI-ECU 38 has input thereto an accelerator pedal operation amount, etc., and outputs a fuel injection command to the fuel control device 20. Further, the FI-ECU 38 outputs the TDC pulses and the CRK pulses with respect to the ACM-ECU 40, together with outputting a cylinder switching signal which indicates switching of the operational state of the engine 12.

1.3 Controls Implemented by the ACM-ECU 40

Figure 3:
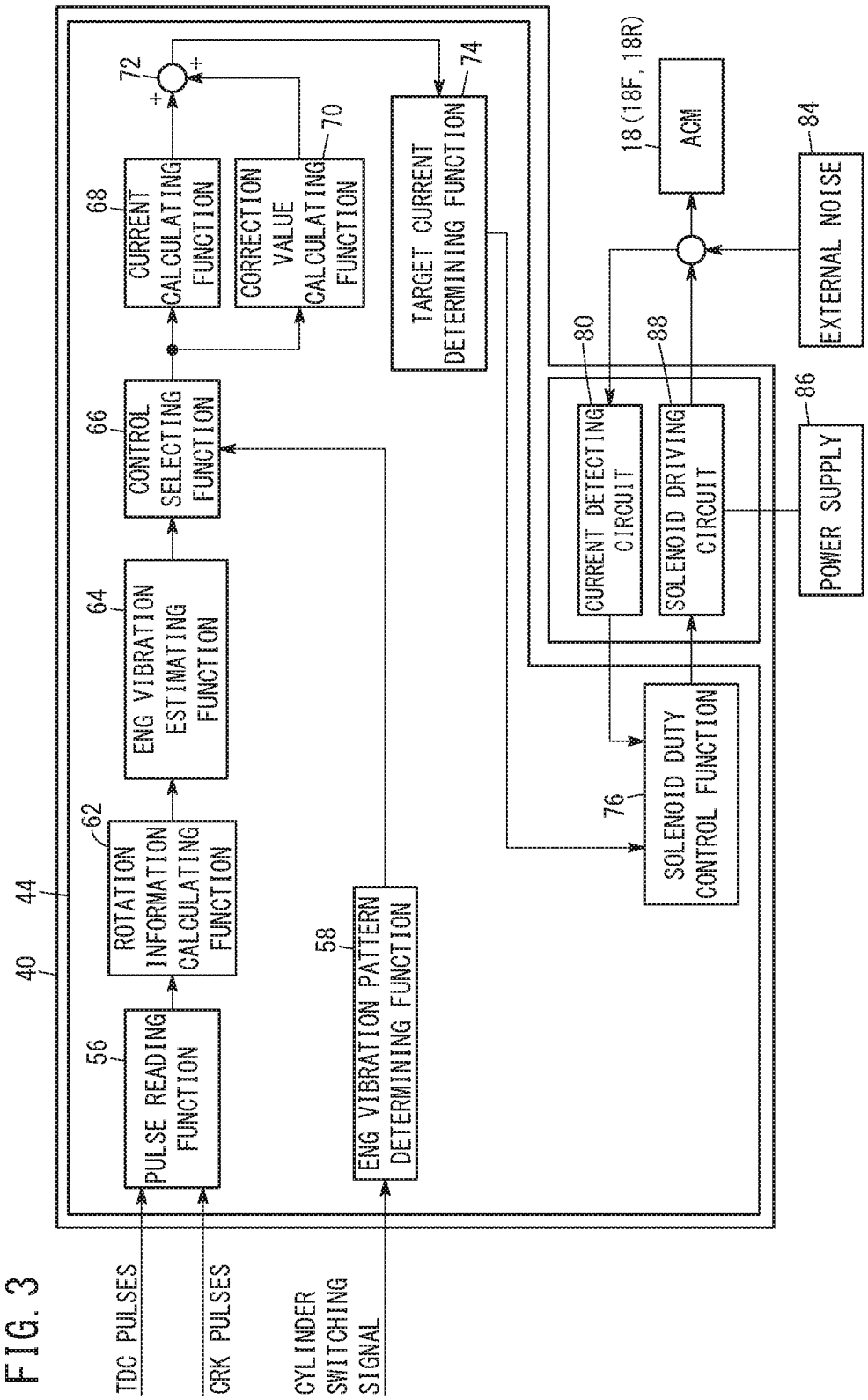
FIG. 3 is a control block diagram of an ACM-ECU employed in the first embodiment.

The controls implemented by the ACM-ECU 40 will be described with reference to FIG. 3. The ACM-ECU 40 obtains the current supplied to energize the ACMs 18 from the processing unit 44, and by the input/output unit 42, outputs drive signals to the ACMs 18. The processing unit 44 executes a feed forward control in consideration of external noise 84, and obtains the current to energize the ACMs 18. The current supplied to the ACMs 18 is stored beforehand in the storage unit 46 as waveform information (a current waveform map 68M and a correction map 70M, to be described later) for canceling out the vibrations of the engine 12 at a predetermined position of the vehicle 10. The processing unit 44 includes the respective functions (a pulse reading function 56 through a solenoid duty control function 76) shown in FIG. 3.

Figures 4A, 4B, 4C:
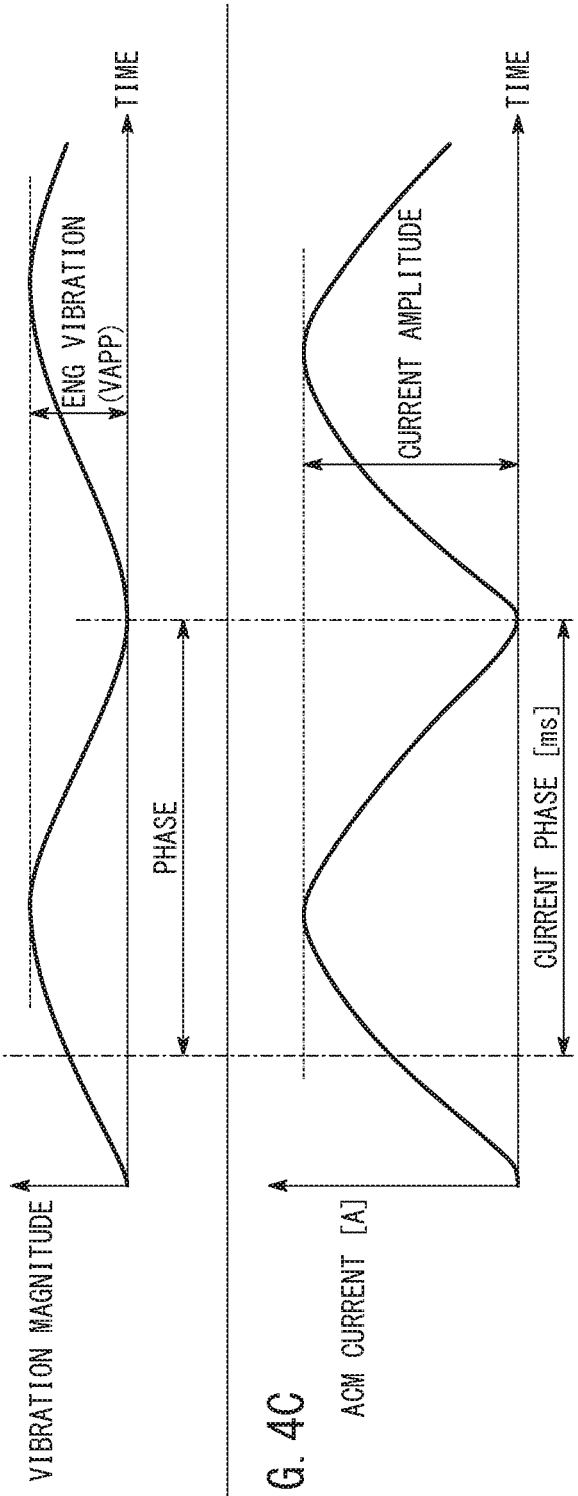
FIG. 4A is a waveform diagram of TDC pulses and CRK pulses.
FIG. 4B is a waveform diagram of engine vibrations.
FIG. 4C is a waveform diagram of a current supplied with respect to an ACM solenoid.

In the pulse reading function 56, the TDC pulses and the CRK pulses output from the FI-ECU 38 are read (see FIG. 4A). In an ENG vibration pattern determining function 58, on the basis of the cylinder switching signal output from the FI-ECU 38, a determination is made as to whether the operational state of the engine 12 is either one of the all-cylinder operational state or the cylinder paused operational state.

In a rotation information calculating function 62, rotation information of the engine 12 is calculated on the basis of the TDC pulses and the CRK pulses, which are read by the pulse reading function 56. In this instance, a period ME and a rotational torque TR are calculated as rotation information of the engine 12. Instead of the period ME, a frequency may be calculated. In the present specification, it is also possible to read the period ME as a rotational speed NE. The period ME is obtained on the basis of the number of TDC pulses or the number of CRK pulses per unit time. On the other hand, the rotational torque TR is obtained in the following manner. Initially, an interval of the CRK pulses is calculated. Next, a crank angular velocity is calculated by dividing a predetermined crank angle by the interval of the CRK pulses, and further, a crank angular acceleration is calculated by differentiating the crank angular velocity over time. In addition, a predetermined inertia about the crankshaft of the engine 12 is multiplied by the crank angular acceleration, to thereby calculate the rotational torque TR about the crankshaft.

In an ENG vibration estimating function 64, an estimated value of the vibration of the engine 12 is calculated. In this instance, a magnitude VAPP (Vibration Amplitude Peak to Peak) of the vibration of the engine 12 is calculated. Hereinafter, the magnitude VAPP of the vibration of the engine 12 will be referred to as a "vibration value VAPP". The vibration value VAPP is obtained from the rotational torque TR, for example. More specifically, a maximum value and a minimum value of the rotational torque TR, which are adjacent to one another in time, are determined, and the difference between the maximum and minimum values is calculated. Such a difference is regarded as the amplitude of the vibrations generated by the engine 12. This amplitude is treated as the vibration value VAPP of the engine 12. As shown in FIG. 4B, since the vibration of the engine 12 is represented by a waveform, the phase P of such vibrations can also be obtained. For example, with reference to a rising or falling timing of an arbitrary TDC pulse Pr, the phase P is determined as an offset value therefrom up to a timing at which the oscillation value VAPP becomes a minimum value.

Moreover, the vibration value VAPP can also be obtained from the CRK pulses, for example. More specifically, initially, a plurality of the CRK pulses measured within one TDC pulse are plotted in coordinates with the elapsed time being set on the horizontal axis, and a cumulative time (cumulative value between the CRK pulses) as a cumulative value of the time measured between the CRK pulses being set on the vertical axis. Next, in such a plot, a straight line (cumulative time between the average of the CRK pulses) connecting the starting and ending values of the plurality of CRK pulses measured within one TDC pulse is calculated. In addition, a deviation of the cumulative time with respect to the straight line (cumulative time between the average of the CRK pulses) is calculated. Such a deviation consists of the same number of data as the number of CRK pulses measured within one TDC pulse. Finally, the difference between the maximum value and the minimum value of the deviation is set as the vibration value VAPP.

As noted previously, the period ME and the rotational torque TR are calculated as rotation information of the engine 12. However, in view of the fact that the vibration value VAPP takes into account the characteristics of the rotational torque TR, the period ME and the vibration value VAPP may also be calculated as rotation information of the engine 12.

In a control selecting function 66, the control for the ACMs 18 is selected on the basis of the operational state of the engine 12 as determined by the ENG vibration pattern determining function 58, and the vibration value VAPP as calculated by the ENG vibration estimating function 64. More specifically, either one of the amplitude variable—phase fixed control or the amplitude variable—phase variable control is selected.

The amplitude variable—phase fixed control is a control in which the amplitude of the active vibrations generated by the actuators of the ACMs 18 is variably controlled in accordance with the rotation information (period ME, rotational torque TR (vibration value VAPP)) of the engine 12, together with fixedly controlling (maintaining) the phase of the active vibrations generated by the actuators irrespective of the vibration value VAPP of the engine 12. Further, the amplitude variable—phase variable control is a control in which the amplitude and the phase of the active vibrations generated by the actuators of the ACMs 18 are both variably controlled in accordance with the rotation information (period ME, rotational torque TR (vibration value VAPP)) of the engine 12. Hereinafter, in order to simplify the description, the amplitude variable—phase fixed control will be referred to simply as a "phase fixed control", and the amplitude variable—phase variable control will be referred to simply as a "phase variable control".

In the control selecting function 66, the phase fixed control is selected in the case that the operational state of the engine 12 is the all-cylinder operational state, and the phase variable control is selected in the case that the operational state of the engine 12 is the cylinder paused operational state. In the event that the vibration value VAPP is greater than or equal to a predetermined vibration value VAPP_th, the phase variable control is prohibited.

In a current calculating function 68, a waveform of the current that is supplied to energize the ACMs 18 is obtained on the basis of the rotation information of the engine 12.

The process of the current calculating function 68 is performed regardless of which of the phase fixed control or the phase variable control is selected by the control selecting function 66. An example of the process performed in the current calculating function 68 will be described below.

Figure 2:
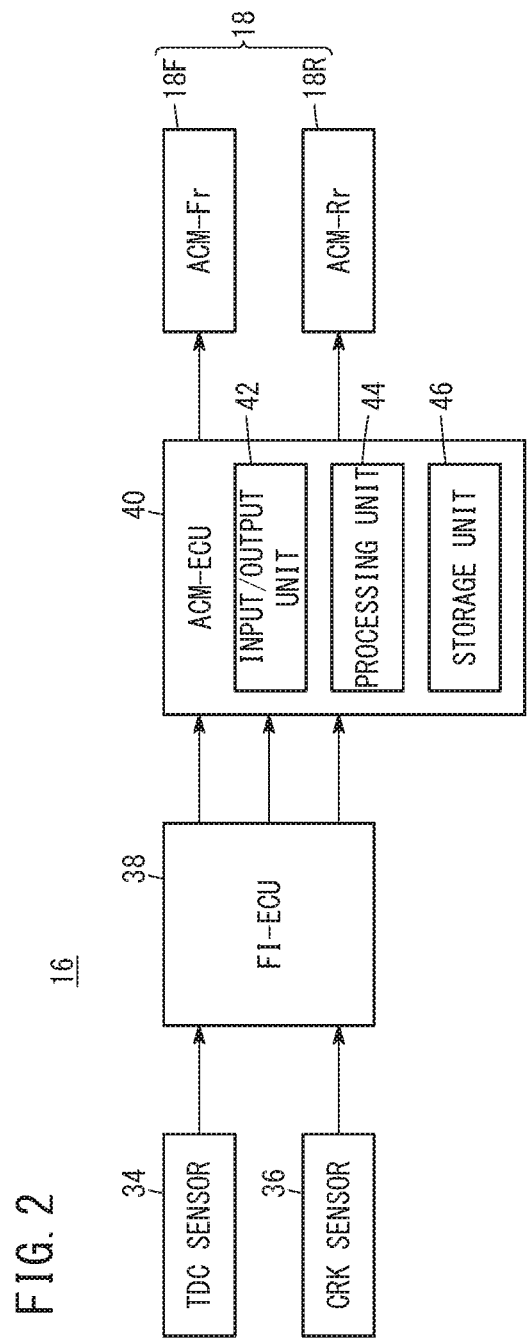
FIG. 2 is a functional block diagram of the active vibration damping device according to the first embodiment.

The current waveform map 68M (see FIG. 5A), in which the current waveform information of the ACMs 18 is associated with the rotation information of the engine 12, is stored in the storage unit 46 (see FIG. 2). The current waveform information is information concerning the current to be supplied to the ACMs 18 for the purpose of damping vibrations at the first position in the vehicle 10, and includes information in relation to the amplitude A, the period T, and the phase P thereof. The current waveform corresponds to the waveform of the vibrations generated by the ACMs 18. The first position corresponds to an evaluation point in the case of performing the phase fixed control. In the present embodiment, the first position is a connection point between the ACMs 18 and the sub-frame 14S. The phase P included in the current waveform information is a phase for a case in which a vibration waveform of the engine 12 is taken as a reference.

A current waveform map 68M is set for each of the ACMs 18. In the individual current waveform maps 68M, current waveform information for suppressing the vibration of the engine 12 at the first position by way of a cooperative control of the respective ACMs 18 is set in association with the rotation information of the engine 12. Moreover, the current waveform information for each of the ACMs 18 may be set collectively at respective addresses of one current waveform map 68M.

Figure 5A:
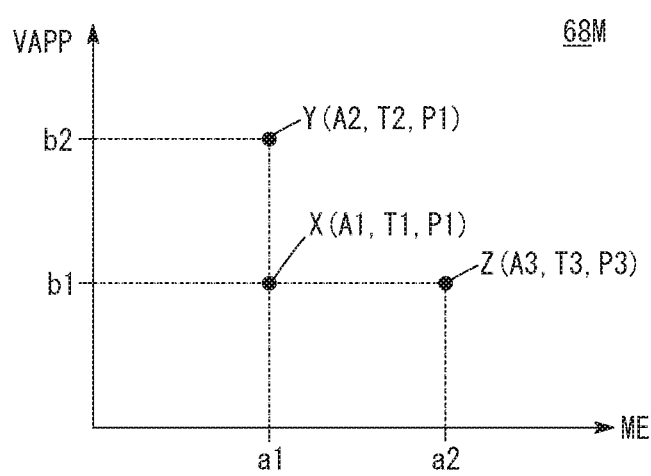
FIG. 5A is a diagram showing a current waveform map.

In the current waveform map 68M shown in FIG. 5A, the current waveform information is linked to an address specified by the period ME (horizontal axis) and the vibration value VAPP (vertical axis). For example, as shown in FIG. 5A, the current waveform information of (amplitude A1, period T1, phase P1) is linked to the address X specified by ME=a1 and VAPP=b1. Further, the current waveform information of (amplitude A2, period T2, phase P1) is linked to the address Y specified by ME=a1 and VAPP=b2. Further, the current waveform information of (amplitude A3, period T3, phase P3) is linked to the address Z specified by ME=a2 and VAPP=b1.

In this manner, in the current waveform map 68M, individual values corresponding to a period ME and a vibration value VAPP are set as the amplitude A and the period T of the current waveform. Also, as the phase P of the current waveform, a value is set that corresponds to the period ME, but is not dependent on the vibration value VAPP. Therefore, in a situation in which the vibration value VAPP varies without any change to the period ME, the amplitude A and the period T obtained from the current waveform map 68M are of different values, whereas the phase P is maintained at the same value.

In a correction value calculating function 70, a correction value for the waveform of the current supplied to energize the ACMs 18 is obtained on the basis of the rotation information of the engine 12. The process of the correction value calculating function 70 is performed in the case that the phase variable control is selected and the phase variable control is not prohibited by the control selecting function 66. An example of the process performed in the correction value calculating function 70 will be described below.

A correction map 70M (see FIG. 5B), in which correction information of the current waveform information of the ACMs 18 is associated with the rotation information of the engine 12, is stored in the storage unit 46 (see FIG. 2). The correction information is information concerning correction values of the current supplied to energize the ACMs 18, for the purpose of damping or suppressing vibrations at the second position in the vehicle 10, and includes information in relation to the amplitude A and the phase P. The second position corresponds to an evaluation point in the case of performing the phase variable control. In the present embodiment, the second position is a connection point between the sub-frame 14S and the main frame 14M, or a connection point between the suspension and the main frame 14M. The first position and the second position may both be the same position.

A correction map 70M is set for each of the ACMs 18. In the individual correction maps 70M, correction information for suppressing the vibration of the engine 12 at the second position by way of a cooperative control of the respective ACMs 18 is set in association with the rotation information of the engine 12. Moreover, the correction information for each of the ACMs 18 may be set collectively at respective addresses of one correction map 70M.

Figure 5B:
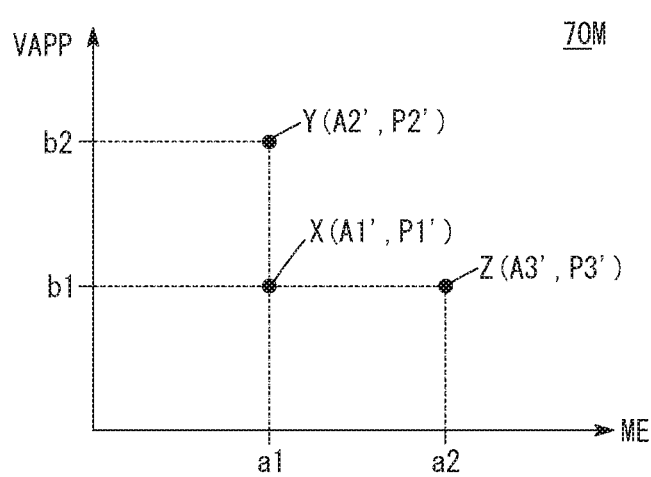
FIG. 5B is a diagram showing a correction map.

In the correction map 70M shown in FIG. 5B, correction information is linked to an address specified by the period ME (horizontal axis) and the vibration value VAPP (vertical axis). For example, as shown in FIG. 5B, the correction information of (amplitude A1', phase P1') is linked to the address X specified by ME=a1 and VAPP=b1. Further, the correction information of (amplitude A2', phase P2') is linked to the address Y specified by ME=a1 and VAPP=b2. Further, the correction information of (amplitude A3', phase P3') is linked to the address Z specified by ME=a2 and VAPP=b1.

In this manner, in the correction map 70M, individual values corresponding to a period ME and a vibration value VAPP are set as correction values of the amplitude A and the phase P of the current waveform. Therefore, in a situation in which the period ME and/or the vibration value VAPP changes, the correction value of the amplitude A and the correction value of the phase P obtained from the correction map 70M are of different values.

In an adding function 72, the correction values of the amplitude A and the phase P obtained by the correction value calculating function 70 are added to the amplitude A and the phase P of the currents for the ACMs 18 obtained by the current calculating function 68. In the case that the phase fixed control is selected by the control selecting function 66, since correction information is not output by the correction value calculating function 70, the current waveform information of the current calculating function 68 is output without modification from the adding function 72. Stated otherwise, it is possible for the phase fixed control to be executed. On the other hand, in the case that the phase variable control is selected by the control selecting function 66, since the correction information is output by the correction value calculating function 70, the current waveform information of the current calculating function 68 is corrected by the correction information of the correction value calculating function 70, and then output from the adding function 72. Stated otherwise, it is possible for the phase variable control to be executed.

In a target current determining function 74, the amplitude A, the period T, and the phase P of the current waveform information, which were calculated by the adding function 72, are determined as target values for the amplitude A, the period T, and the phase P of currents supplied to energize the solenoids of the ACMs 18 (see FIG. 4C).

In a solenoid duty control function 76, a duty ratio for realizing the currents to be supplied to the solenoids is determined on the basis of the amplitude A, the period T, and the phase P of the currents determined by the target current determining function 74. At this time, a feedback control, for example a PID control, is performed on the basis of the actual currents of the ACMs 18 detected by a current detecting circuit 80.

A solenoid drive circuit 88 included in the input/output unit 42 is connected to a power supply 86, and outputs drive signals to the ACMs 18 on the basis of the duty ratio obtained from the solenoid duty control function 76.

1.4. Process Flow of ACM-ECU 40

Figure 6:
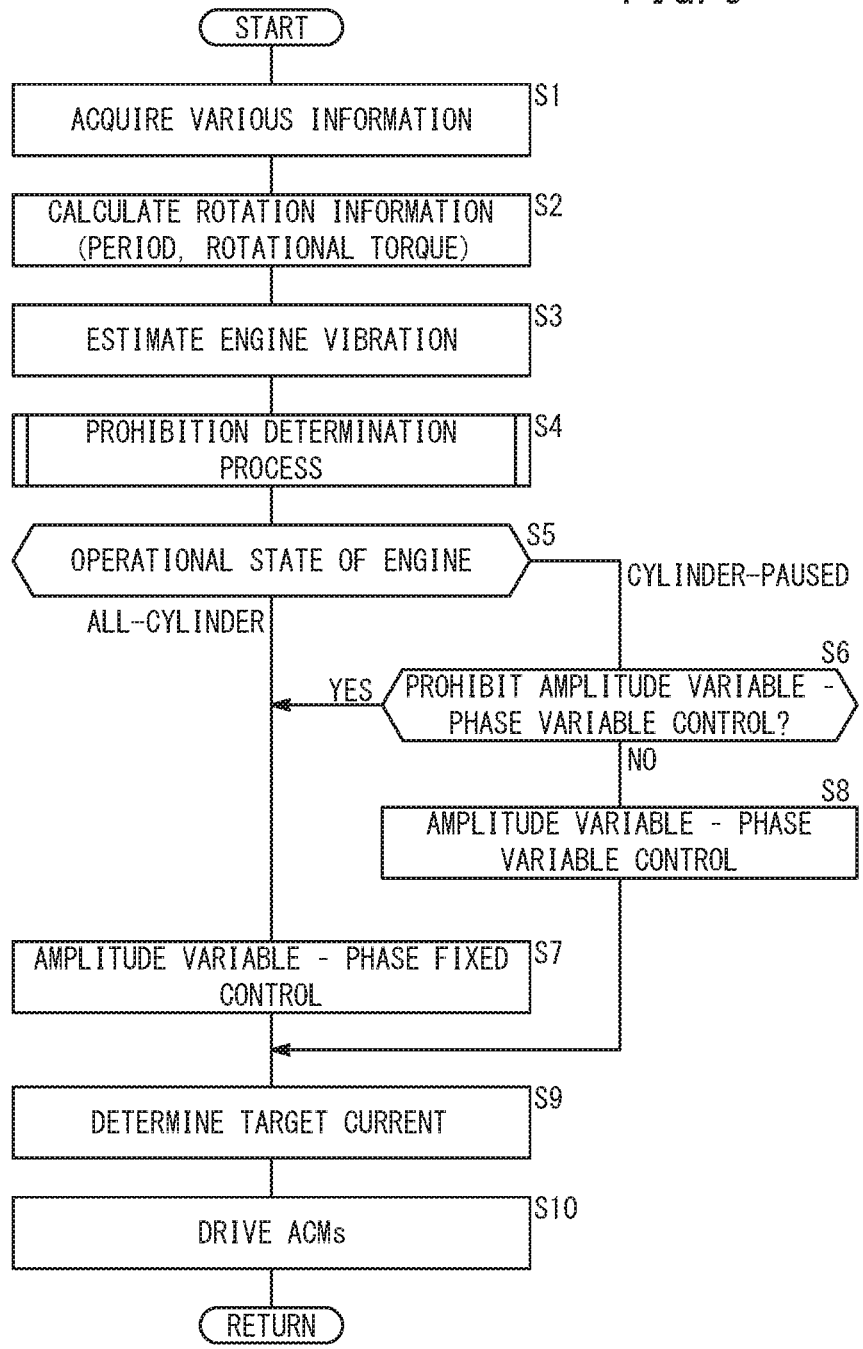
FIG. 6 is a flowchart of processes that are executed according to the first embodiment.

A series of processes executed by the ACM-ECU 40 will be described with reference to FIG. 6. FIG. 6 shows the series of control blocks shown in FIG. 3 in the form of a process flow. The ACM-ECU 40 repeatedly executes the processes described below at extremely short time intervals.

In step S1, various information, in this instance, the TDC pulses, the CRK pulses, and cylinder switching signals and the like are acquired. In step S2, the rotation information (the period ME and the rotational torque TR) of the engine 12 is calculated on the basis of the TDC pulses and the CRK pulses.

In step S3, the vibration of the engine 12 is estimated. According to the present embodiment, the vibration value VAPP is calculated. In step S4, a prohibition determination process is performed (see FIG. 7). In this instance, a determination is made as to whether or not to prohibit the phase variable control. The prohibition determination process will be described in detail later.

In step S5, the operational state of the engine 12 is determined. In the case of the all-cylinder operational state (step S5: all-cylinder), the process transitions to step S7. On the other hand, in the case of the cylinder paused operational state (step S5: cylinder paused), the process transitions to step S6.

In the case that a transition is made from step S5 to step S6, a determination is made as to whether or not to prohibit the phase variable control. As was described above in item [1.3], in the event that the vibration value VAPP is determined by the control selecting function 66 to be greater than or equal to the predetermined vibration value VAPP_th, the phase variable control is prohibited. In the case that the phase variable control is prohibited (step S6: YES), the process transitions to step S7. On the other hand, if the phase variable control is not prohibited (step S6: NO), then the process transitions to step S8.

In the case that a transition is made from step S5 or step S6 to step S7, the phase fixed control is executed. In this instance, the waveform (the amplitude A, the period T, and the phase P) of the current supplied to energize the ACMs 18 is determined on the basis of the period ME calculated in step S2 and the vibration value VAPP calculated in step S3. More specifically, as described above in item [1.3], the current waveform (the amplitude A, the period T, and phase P) is obtained using the current waveform map 68M shown in FIG. 5A. In accordance with the current waveform map 68M, as long as the period ME of the engine 12 does not change, the same phase P is obtained for each of the calculations. Stated otherwise, the phase P is fixed (maintained).

In the case that a transition is made from step S6 to step S8, the phase variable control is executed. In this instance, the waveform (the amplitude A, the period T, and the phase P) of the current supplied to energize the ACMs 18 is determined on the basis of the period ME calculated in step S2 and the vibration value VAPP calculated in step S3. More specifically, as described above in item [1.3], the current waveform (the amplitude A, the period T, and the phase P) is obtained using the current waveform map 68M shown in FIG. 5A, and further, the correction value therefor (the amplitude A and the phase P) is obtained using the correction map 70M shown in FIG. 5B. Then, the current waveform is corrected using the correction value.

In step S9, the target current is determined on the basis of the current waveform obtained in step S7 or step S8. In step S10, the ACMs 18 are driven based on the target current determined in step S9.

1.5. Prohibition Determination Process

Figure 7:
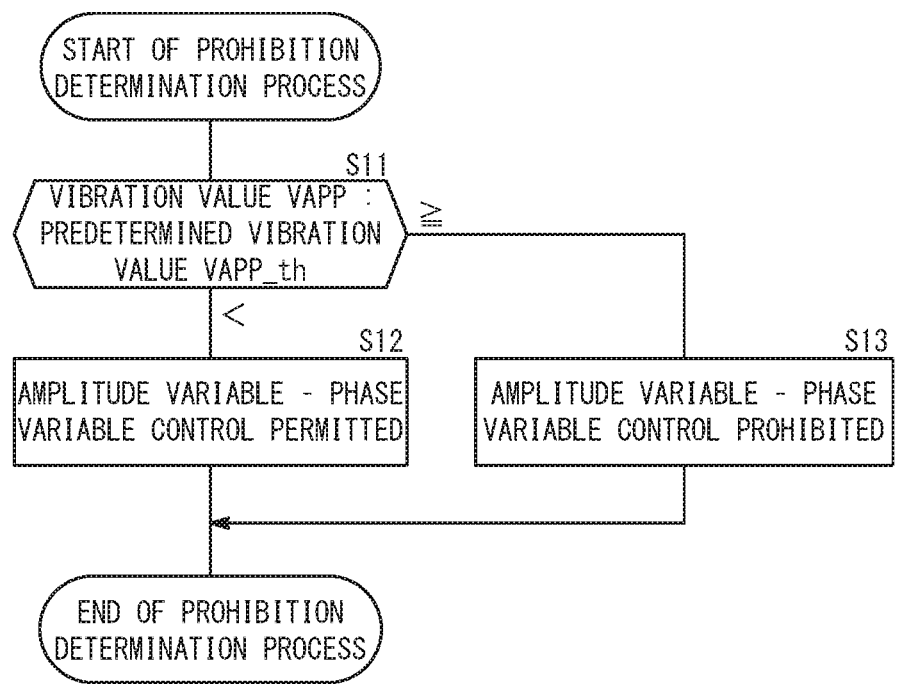
FIG. 7 is a flowchart of a prohibition determination process that is executed according to the first embodiment.

With reference to FIG. 7, a description will be given of the prohibition determination process (step S4 of FIG. 6). In step S11, a comparison is made between the vibration value VAPP calculated in step S3 of FIG. 6 and the predetermined vibration value VAPP_th stored in the storage unit 46. In the case that the vibration value VAPP is less than the predetermined vibration value VAPP_th (step S11: <), the process transitions to step S12. Then, in step S12, the phase variable control is permitted. On the other hand, in the case that the vibration value VAPP is greater than or equal to the predetermined vibration value VAPP_th (step S11: the process transitions to step S13. Then, in step S13, the phase variable control is prohibited.

1.6. Switching Between Phase Fixed Control and Phase Variable Control

The processing unit 44 of the ACM-ECU 40 sets a first time interval, which is required for switching from the phase fixed control to the phase variable control, not to be equal to a second time interval, which is required for switching from the phase variable control to the phase fixed control. According to the present embodiment, the first time interval is set to be longer than the second time interval.

For example, at a time of switching the controls, the correction value calculating function 70 multiplies the correction value (the amplitude A, the phase P) obtained using the correction map 70M by a coefficient that varies from 0 to 1. At this time, and more specifically, at a time of switching from the phase fixed control to the phase variable control, the coefficient is gradually increased (from 0 to 1) together with the elapse of time, and at a time of switching from the phase variable control to the phase fixed control, the coefficient is gradually decreased (from 1 to 0) together with the elapse of time. The first time interval can be set to be longer than the second time interval by decreasing the rate at which the coefficient is changed when switching from the phase fixed control to the phase variable control, and by increasing the rate at which the coefficient is changed when switching from the phase variable control to the phase fixed control.

Comparing the phase fixed control and the phase variable control, the phase fixed control tends to be more stable. In such a case, if switching is carried out quickly from the phase fixed control to the phase variable control, there is a concern that the control may become unstable. Therefore, by making the first time interval longer than the second time interval and thereby gradually switching between the controls, it is possible to prevent the control from becoming unstable. Further, by making the second time interval shorter than the first time interval, switching between the controls can be performed quickly.

Figure 8A:
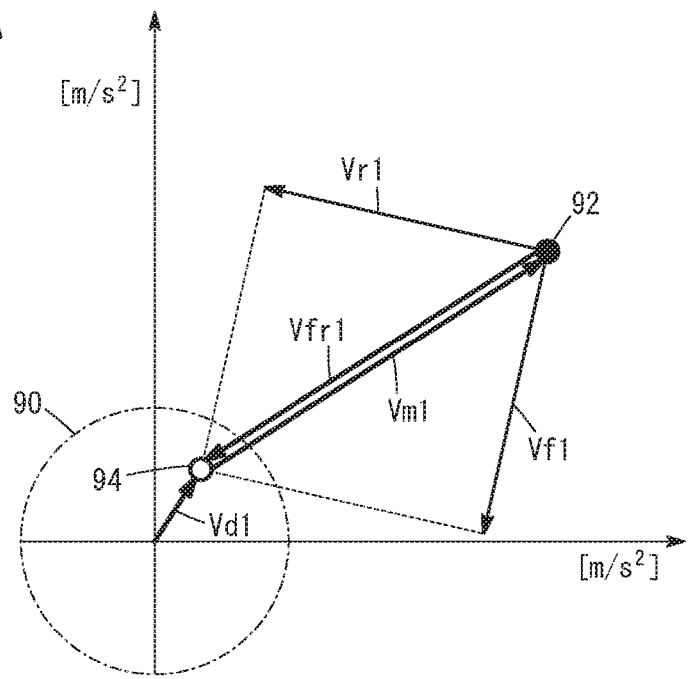
FIG. 8A is a vector diagram for explaining operations and effects of the phase fixed control.
Figure 8B:
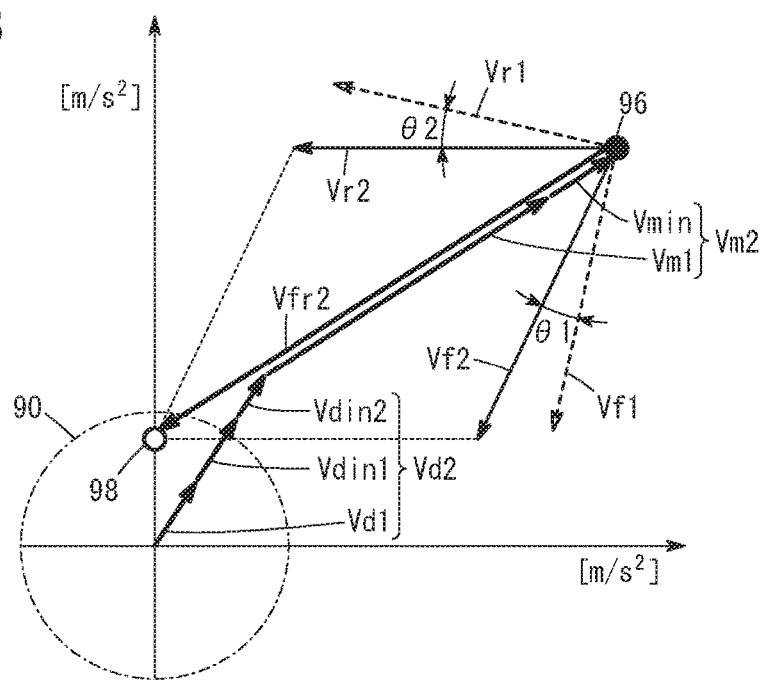
FIG. 8B is a vector diagram for explaining operations and effects of the phase variable control.

1.7. Operations and Effects of Phase Fixed Control and Phase Variable Control Operations and effects of the active vibration damping device 16 will be described with reference to FIGS. 8A and 8B. FIGS. 8A and 8B are vector diagrams showing a magnitude and phase of the respective vibrational components that propagate to the evaluation point set within the vehicle 10.

In the present embodiment, as the evaluation point, the aforementioned second position is used which is a connection point between the sub-frame 14S and the main frame 14M, or a connection point between the suspension and the main frame 14M. In FIGS. 8A and 8B, the length of the vector is indicative of the magnitude (in units of [m/s$^2$]) of a driving force generated by each of the respective vibrations, and the angle of the vector (an angle of rotation in a positive direction, i.e., a counterclockwise direction, with reference to a positive direction of the horizontal axis) is indicative of the phase, taking the vibration of the engine 12 as a reference. Further, in FIGS. 8A and 8B, the circular shaped allowable range 90 is indicative of an allowable range for the driving force.

With reference to FIG. 8A, a description will be presented of the operations and effects of the phase fixed control, which is implemented in the event that the operational state of the engine 12 is the all-cylinder operational state, and the engagement rate Lr of the LC 26 is not 100% (roughly 96% to 97%). In the case of the all-cylinder operational state, and if the engagement rate Lr of the LC 26 is not 100%, the vibration Vd1 of the engine 12 propagates through the drive system path to the evaluation point, whereas the vibration Vm1 of the engine 12 propagates through the mounting system path. As indicated at point 92 in FIG. 8A, in accordance with the vibration Vd1 and the vibration Vm1, the driving force of the vibrations at the evaluation point falls outside of the allowable range 90.

When the phase fixed control is executed using the current waveform map 68M (see FIG. 5A), the vibration Vf1 of the ACM-Fr 18F and the vibration Vr1 of the ACM-Rr 18R propagate to the evaluation point through the mounting system path. At this time, the phase of the vibration Vf1 and the phase of the vibration Vr1 are controlled on the basis of the vibration of the engine 12 so as to remain constant. In this instance, the phase of the vibration Vf1 is controlled so as to be delayed by roughly 90 degrees from the phase of the vibration Vr1. As shown at point 94 in FIG. 8A, the vibrations transmitted from the engine 12 are canceled out by the composite vibration Vfr1 made up of the vibration Vf1 and the vibration Vr1, and thus, the magnitude of the vibrations at the evaluation point can be made to reside within the allowable range 90.

With reference to FIG. 8B, a description will be presented of the operations and effects of the phase variable control, which is implemented in the event that the operational state of the engine 12 is the cylinder paused operational state, and the engagement rate Lr of the LC 26 is roughly 100%. While the period ME of the engine 12 remains constant, the engine 12 is switched from the all-cylinder operational state to the cylinder paused operational state, and further, the engagement rate Lr of the LC 26 becomes 100%. At this time, the vibration Vd2 of the engine 12 propagates through the drive system path to the evaluation point, whereas the vibration Vm2 of the engine 12 propagates through the mounting system path. The vibration Vd2 is made up of a combination of a vibration Vd1 shown in FIG. 8A, a vibration Vdin1, which is increased in accordance with the cylinder paused operational state, and a vibration Vdin2, which is increased as a result of the engagement rate Lr of the LC 26 becoming 100%. Further, the vibration Vm2 is made up of a combination of the vibration Vm1 shown in FIG. 8A and a vibration Vmin, which is increased in accordance with the cylinder paused operational state. As indicated at point 96 in FIG. 8B, in accordance with the vibration Vd2 and the vibration Vm2, the magnitude of the vibrations at the evaluation point falls outside of the allowable range 90. The vibrations generated at this time become larger than the vibrations (at point 92) generated during the all-cylinder operational state.

When the phase variable control is executed using the current waveform map 68M (see FIG. 5A) and the correction map 70M (see FIG. 5B), the vibration Vf2 of the ACM-Fr 18F and the vibration Vr2 of the ACM-Rr 18R propagate to the evaluation point through the mounting system path. In comparison with the vibration Vf1 shown in FIG. 8A, the vibration Vf2 changes in a direction (the clockwise direction in the drawing) in which the driving force becomes larger, and the phase is delayed by the phase angle θ1 [deg]. In comparison with the vibration Vr1 shown in FIG. 8A, the vibration Vr2 changes in a direction (the counterclockwise direction in the drawing) in which the driving force becomes larger, and the phase is advanced by the phase angle θ2 [deg].

According to the present embodiment, the phase variable control is carried out in order to control the currents supplied to energize the ACM-Fr 18F and the ACM-Rr 18R, and the phase of the vibration Vf2 and the phase of the vibration Vr2 are made to change mutually in opposite directions (an advancing direction and a delayed direction). Upon doing so, the composite vector made up of the vibration Vf2 and the vibration Vr2 becomes larger. Stated otherwise, in accordance with the phase variable control, the driving force of the vibrations that propagate to the evaluation point as a result of driving the ACMs 18 can be made larger than during the phase fixed control. As shown at point 98 in FIG. 8B, the vibrations transmitted from the engine 12 are canceled out by the composite vibration Vfr2 made up of the vibration Vf2 and the vibration Vr2, and thus, the magnitude of the vibrations at the evaluation point can be made to reside within the allowable range 90.

As shown in FIG. 8B, the driving force of the vibration Vf2 and the driving force of the vibration Vr2 are substantially the same, and further, the phase angle θ1 and the phase angle θ2 are substantially the same. By setting the phase angle θ1 and the phase angle θ2 to be substantially equivalent, it is possible to increase the driving force of the composite vibration Vfr2. However, the driving force of the vibration Vf2 and the driving force of the vibration Vr2 may differ, or the phase angle θ1 and the phase angle θ2 may differ from each other. In essence, the driving force of the vibration Vf2 and the driving force of the vibration Vr2, as well as the phase angle θ1 and the phase angle θ2, may be of any value, insofar as the driving force of the vibrations at the evaluation point can be returned from the point 96 to a point lying within the allowable range 90.

Moreover, if the current supplied to energize the respective ACMs 18 is made to increase to a rated value, the amplitude of the vibrations output from each of the ACMs 18 can be maximized. As a result, by driving the ACMs 18, it is possible to maximize the driving force of the vibrations propagated therefrom to the evaluation point.

1.8. Modifications

The phase variable control of the present embodiment is a control for correcting the current waveform map 68M (see FIG. 5A) using the correction map 70M (see FIG. 5B). Instead of such a control, the phase fixed control and the phase variable control may be executed using respective independent current waveform maps.

According to the present embodiment, the current waveform map 68M (see FIG. 5A) is used in which current waveform information (the amplitude A, the period T, the phase P) is linked to each of respective addresses. Instead of this feature, a plurality of maps in which individual information is associated with each of the respective addresses may be used. For example, a current amplitude map in which information of the amplitude A and the period T of the current waveform is linked to each of the respective addresses, and a current phase map in which information of the phase P of the current waveform is linked to each of the respective addresses may be used. Further, according to the present embodiment, a correction map 70M (see FIG. 5B) is used in which correction information of the amplitude A and the phase P of the current waveform is linked with each of the respective addresses. Instead of this feature, a plurality of maps in which individual information is associated with each of the respective addresses may be used. For example, a current amplitude correction map in which correction information of the amplitude A of the current waveform is linked to each of the respective addresses, and a phase correction map in which correction information of the phase P of the current waveform is linked to each of the respective addresses may be used.

1.9. Summary of the First Embodiment

The first embodiment relates to the active vibration damping device 16, which is equipped with the ACMs 18 (engine mounts) interposed between the vehicle body 14 and the multi-cylinder engine 12 (internal combustion engine) mounted in the vehicle 10, and which is adapted to suppress vibrations transmitted from a side of the engine 12 to a side of the vehicle body 14, by active vibrations generated by actuators of the ACMs 18. The active vibration damping device 16 is equipped with the ACM-ECU 40 (vibration control unit) which controls active vibrations generated by the actuators on the basis of rotation information of the engine 12. The ACM-ECU 40 includes the ENG vibration pattern determining function 58 (operational state detection unit) for detecting whether the operational state of the engine 12 is the all-cylinder operational state in which combustion takes place in all of the cylinders, or the cylinder paused operational state in which combustion is paused in a portion of the cylinders. In addition, the ACM-ECU 40 executes the phase fixed control for variably controlling the amplitude of the active vibrations generated by the actuators according to the rotation information, together with fixedly controlling the phase of the active vibrations generated by the actuators, in the case that the all-cylinder operational state is detected by the ENG vibration pattern determining function 58. Further, the ACU-ECU 40 executes the phase variable control for variably controlling the amplitude and phase of the active vibrations generated by the actuators according to the rotation information, in the case that the cylinder paused operational state is detected by the ENG vibration pattern determining function 58.

According to the first embodiment, in the case that the operational state of the engine 12 is the all-cylinder operational state, the phase fixed control is executed, and in the case that the operational state of the internal combustion engine is the cylinder paused operational state, the phase variable control is executed. In accordance with this feature, at the time of the cylinder paused operational state in which vibrations are increased more than in the all-cylinder operational state, vibrations that are propagated from the engine 12 to the vehicle cabin 10a can suitably be suppressed by executing the phase variable control in which the vibration suppression effect is large.

The ACM-ECU 40 includes the ENG vibration estimating function 64 (vibration estimation unit) which estimates the vibration value VAPP of the engine 12 on the basis of the rotation information of the engine 12. The ACM-ECU 40 prohibits the phase variable control, in the case that the vibration value VAPP estimated by the ENG vibration estimating function 64 is greater than or equal to a predetermined vibration value VAPP_th.

If the vibration of the engine 12 is too large, cases occur in which, even if the phase variable control is performed, vibrations that propagate from the engine 12 to the vehicle cabin 10a cannot be suitably suppressed. At this time, the arithmetic processing load can be reduced by prohibiting the phase variable control. Further, since supply of electrical power that does not contribute to suppressing vibrations is halted, the power consumption of the actuators can be reduced.

2. Second Embodiment

An active vibration damping device 116 according to a second embodiment is a device in which a further function, and more specifically, a failure detecting function, is added to the active vibration damping device 16 according to the first embodiment. Concerning the second embodiment, attention will be focused on explanations in relation to configurations and functions thereof that differ from the first embodiment, whereas explanations of configurations and functions thereof that are the same as those of the first embodiment will be omitted.

2.1. Configuration of Active Vibration Damping Device 116

Figure 9:
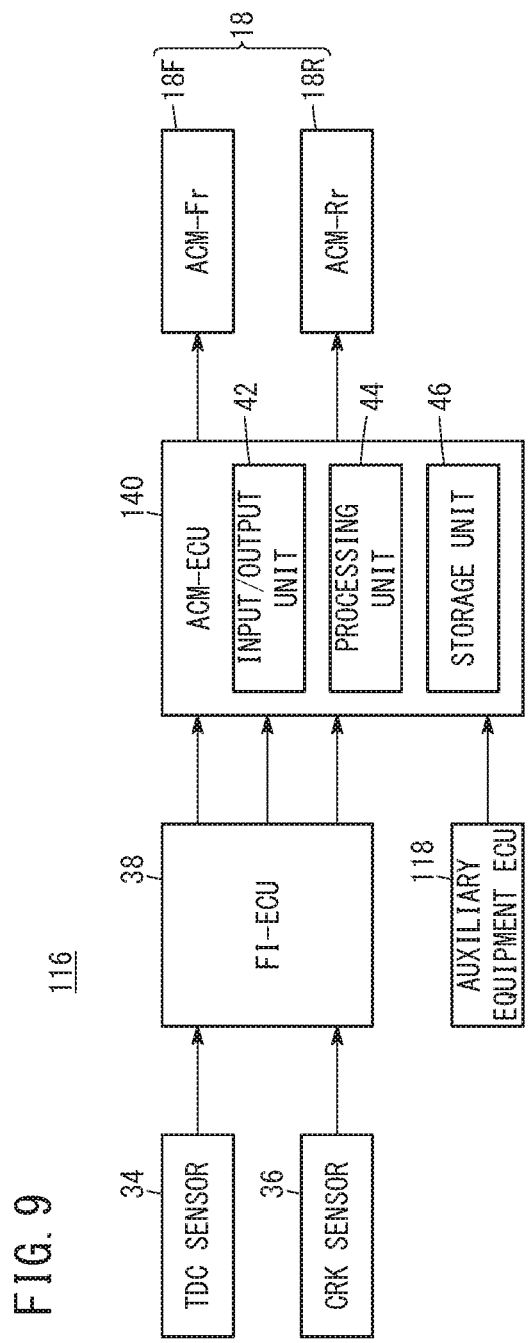
FIG. 9 is a functional block diagram of the active vibration damping device according to a second embodiment.

The configuration of the active vibration damping device 116 according to the second embodiment will be described with reference to FIG. 9. The active vibration damping device 116 includes an ACM-ECU 140 instead of the ACM-ECU 40 according to the first embodiment, and further includes an auxiliary equipment ECU 118 for controlling auxiliary equipment (not shown).

The auxiliary equipment ECU 118 is a computer including a microcomputer. The auxiliary equipment ECU 118 controls auxiliary equipment driven by the engine 12, for example, a cooling device and an intercooler (neither of which is shown), etc., together with detecting failures of such auxiliary equipment.

2.2. Controls Implemented by the ACM-ECU 140

Figure 10:
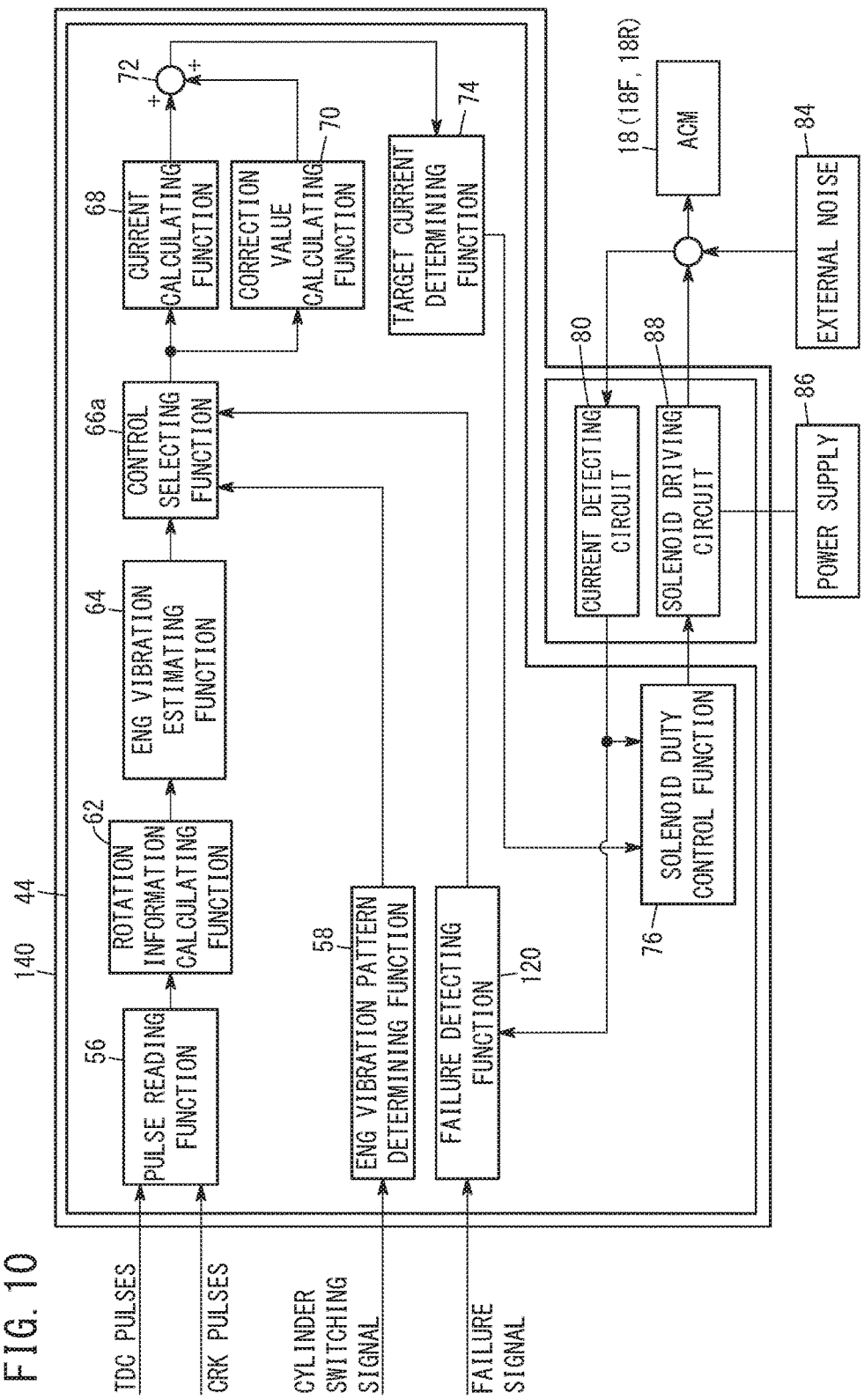
FIG. 10 is a control block diagram of an ACM-ECU employed in the second embodiment.

As shown in FIG. 10, the ACM-ECU 140, in addition to the respective functions implemented by the ACM-ECU 40 according to the first embodiment, further includes a failure detecting function 120.

In the failure detecting function 120, failures generated by any of the various auxiliary equipment are detected on the basis of failure signals output from the auxiliary equipment ECU 118. Further, generation of failures in the actuators of the ACMs 18 are detected on the basis of the currents from the ACMs 18, which are detected by the current detecting circuit 80.

In a control selecting function 66a, the control for the ACMs 18 is selected on the basis of the operational state of the engine 12 as determined by the ENG vibration pattern determining function 58, the vibration value VAPP as calculated by the ENG vibration estimating function 64, and the presence or absence of any failure as detected by the failure detecting function 120. More specifically, the phase fixed control is selected in the case that the operational state of the engine 12 is the all-cylinder operational state, and the phase variable control is selected in the case that the operational state of the engine 12 is the cylinder paused operational state. However, in the event that a failure is detected by the failure detecting function 120, or if the vibration value VAPP is greater than or equal to a predetermined value, the phase variable control is prohibited.

2.3. Process Flow of ACM-ECU 140

Figure 11:
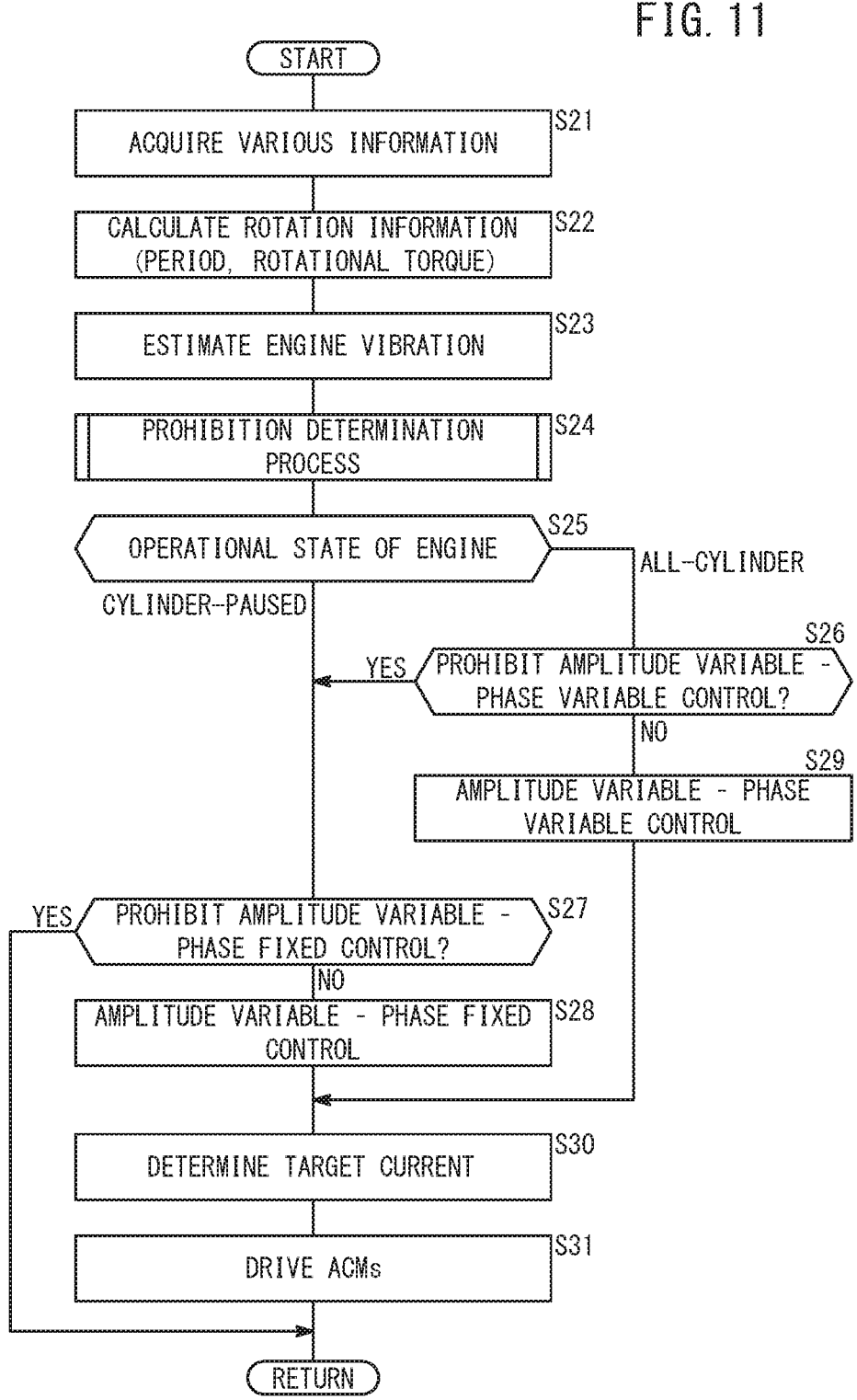
FIG. 11 is a flowchart of processes that are executed according to the second embodiment.

With reference to FIG. 11, a description will be given of a series of processes executed by the ACM-ECU 40. The processes of step S21 to step S23, step S25, step S26, and step S28 to step S31 shown in FIG. 11 correspond to the processes of step S1 to step S3, step S5, and step S6 to step S10 shown in FIG. 6. Processes which are unique to the second embodiment are the process of step S24 and the process of step S27.

In the case that a transition is made from step S25 to step S26, a determination is made as to whether or not the phase variable control is being prohibited. As described in item [2.2] above, in the event that a failure of the auxiliary equipment is detected by the failure detecting function 120, or if the vibration value VAPP is determined to be greater than or equal to a predetermined value by the control selecting function 66a, the amplitude variable—phase variable control is prohibited. In the case that the phase variable control is being prohibited (step S26: YES), the process transitions to step S27. On the other hand, if the phase variable control is not prohibited (step S26: NO), then the process transitions to step S29.

In the case that a transition is made from step S25 or step S26 to step S27, a determination is made as to whether or not the phase fixed control is being prohibited. As described in item [2.2] above, in the event that a failure of the actuators of the ACMs 18 is detected by the failure detecting function 120, the phase fixed control is prohibited. In the case that the phase fixed control is being prohibited (step S27: YES), the process is temporarily suspended, and the series of processes are executed again. On the other hand, if the phase fixed control is not prohibited (step S27: NO), the process transitions to step S28, and the phase fixed control is executed.

2.4. Prohibition Determination Process

Figure 12:
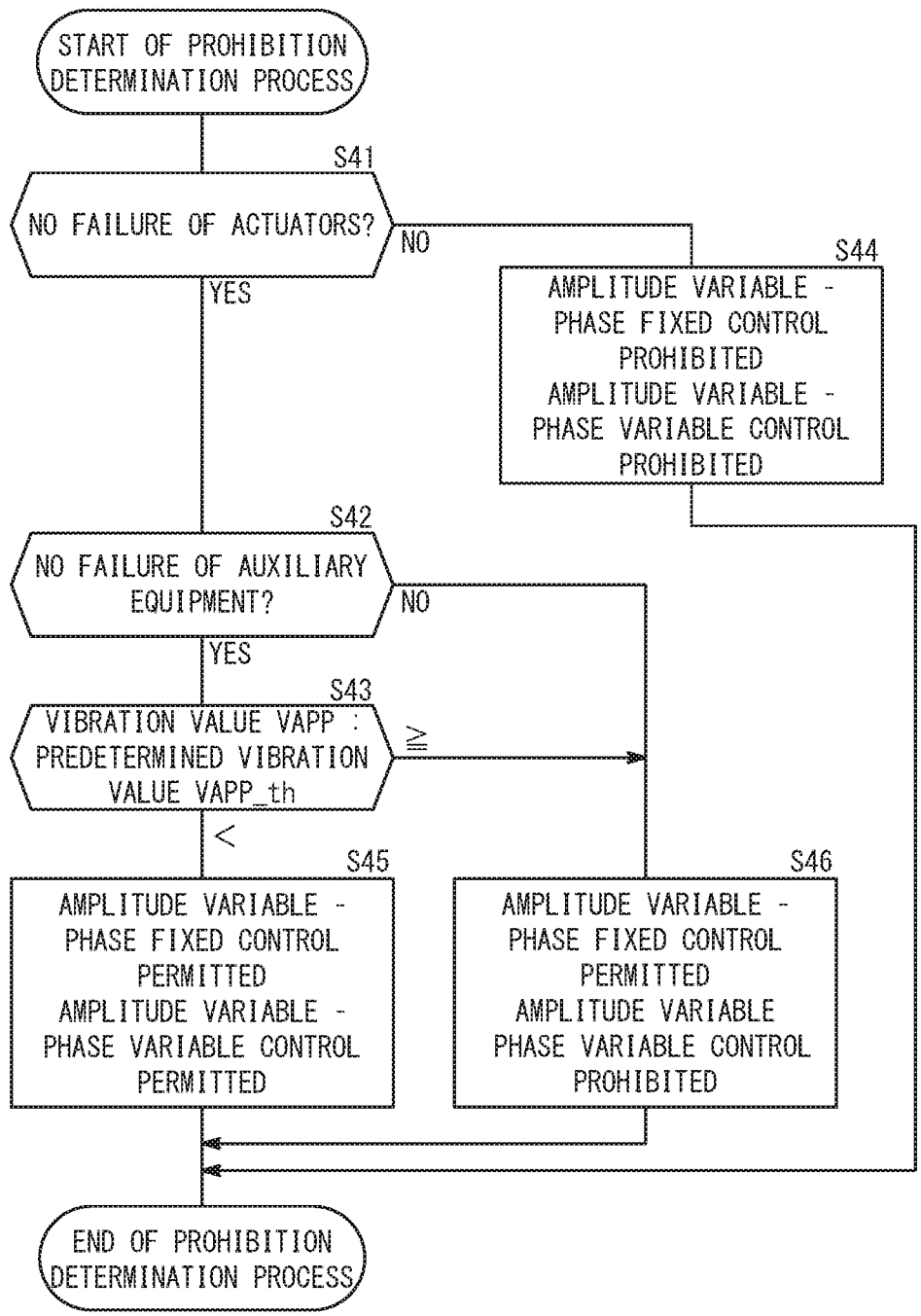
FIG. 12 is a flowchart of a prohibition determination process that is executed according to the second embodiment.

With reference to FIG. 12, a description will be given of the prohibition determination process (step S24 of FIG. 11) according to the second embodiment. In step S41, a determination is made as to whether or not the actuators of the ACMs 18 are faulty. In the case of no failure (step S41: YES), the process transitions to step S42. On the other hand, if there is a failure (step S41: NO), the process transitions to step S44. Then, in step S44, both the phase fixed control and the phase variable control are prohibited.

In the case that a transition is made from step S41 to step S42, a determination is made as to whether or not a failure is occurring in the auxiliary equipment driven by the engine 12. In the case of no failure (step S42: YES), the process transitions to step S43. On the other hand, if there is a failure (step S42: NO), the process transitions to step S46. Then, in step S46, the phase fixed control is permitted, whereas the phase variable control is prohibited.

In the case of transitioning from step S42 to step S43, a comparison is made between the vibration value VAPP and the predetermined vibration value VAPP_th. In the case that the vibration value VAPP is less than the predetermined vibration value VAPP_th (step S43: <), the process transitions to step S45. Then, in step S45, both the phase fixed control and the phase variable control are permitted. However, in the case that the vibration value VAPP is greater than or equal to the predetermined vibration value VAPP_th (step S43: the process transitions to step S46. Then, in step S46, the phase fixed control is permitted, whereas the phase variable control is prohibited.

2.5 Modifications

In the case that failures of either one of the ACM-Fr 18F and the ACM-Rr 18R are detected, both the phase variable control (and the phase fixed control) may be prohibited.

2.6 Summary of the Second Embodiment

The active vibration damping device 116 according to the second embodiment offers the same advantages and effects as those of the active vibration damping device 16 according to the first embodiment. Furthermore, the ACM-ECU 140 according to the second embodiment includes the failure detecting function 120 for detecting a failure of at least one of the auxiliary devices driven by the engine 12. The ACM-ECU 140 prohibits the phase variable control in the event that a failure of an auxiliary device is detected by the failure detecting function 120.

If an auxiliary device driven by the engine 12 experiences a failure, the vibration characteristics may change. In the case that the vibration characteristics are changed, there is a concern that, contrary to expectations, vibrations may actually increase if the phase variable control were executed. At this time, by prohibiting the phase variable control, it is possible to prevent the vibrations from increasing.

The ACM-ECU 140 includes the failure detecting function 120 for detecting a failure of the actuators. The ACM-ECU 140 prohibits the phase variable control in the event that a failure of an actuator is detected by the failure detecting function 120.

In the event there is a failure of an actuator of the ACMs 18, the phase variable control cannot be executed. At this time, by prohibiting the phase variable control, there is no need to execute arithmetic processing or the like for the phase variable control. Therefore, the arithmetic processing load can be reduced. Further, since supply of electrical power that does not contribute to suppressing vibrations is halted, the power consumption of the actuators can be reduced.

It is a matter of course that the active vibration damping devices 16, 116 according to the present invention are not limited to the embodiments described above, and various additional or modified configurations could be adopted therein without departing from the essence and gist of the present invention.

What is claimed is:

1. An active vibration damping device comprising an engine mount interposed between a vehicle body and a multi-cylinder internal combustion engine mounted in the vehicle, and which is configured to suppress vibrations transmitted from a side of the internal combustion engine to a side of the vehicle body, by active vibrations generated by an actuator of the engine mount, comprising:
a central processing unit configured to control the active vibrations generated by the actuator on basis of rotation information of the internal combustion engine;
wherein the central processing unit:
detects whether an operational state of the internal combustion engine is an all-cylinder operational state in which combustion takes place in all of the cylinders, or a cylinder paused operational state in which combustion is paused in a portion of the cylinders;
executes an amplitude variable—phase fixed control for variably controlling the amplitude of the active vibrations generated by the actuator according to the rotation information, together with fixedly controlling the phase of the active vibrations generated by the actuator, in response to the detection of the all-cylinder operational state; and
executes an amplitude variable—phase variable control for variably controlling the amplitude and phase of the active vibrations generated by the actuator according to the rotation information, in response to the detection of the cylinder paused operational state.

2. The active vibration damping device according to claim 1, wherein the central processing unit:
estimates a vibration value of the internal combustion engine on basis of the rotation information from the internal combustion engine; and
prohibits the amplitude variable—phase variable control, in response to the estimation of the vibration value being greater than or equal to a predetermined vibration value.

3. The active vibration damping device according to claim 1, wherein the central processing unit sets a first time interval, which is required for switching from the amplitude variable—phase fixed control to the amplitude variable—phase variable control, to be longer than a second time interval, which is required for switching from the amplitude variable—phase variable control to the amplitude variable—phase fixed control.

4. The active vibration damping device according to claim 1, wherein the central processing unit:
detects at least one failure of auxiliary equipment driven by the internal combustion engine; and
prohibits the amplitude variable—phase variable control, in response to the detection of a failure of the auxiliary equipment.

5. The active vibration damping device according to claim 1, wherein the central processing unit:
detects a failure of the actuator; and
prohibits the amplitude variable—phase variable control, in response to the detection of a failure of the actuator.

6. The active vibration damping device according to claim 1, wherein:
the vehicle body is constituted to include a main frame and a sub-frame;
the engine mount is fixed to the sub-frame; and
the central processing unit:
during the amplitude variable—phase fixed control, operates the engine mount so as to suppress vibrations at a connection point between the engine mount and the sub-frame; and
during the amplitude variable—phase variable control, operates the engine mount so as to suppress vibrations at a connection point between the sub-frame and the main frame, or vibrations at a connection point between a suspension of the vehicle and the main frame.

7. An active vibration damping device comprising first and second engine mounts interposed between a vehicle body and a multi-cylinder internal combustion engine mounted in the vehicle, and which is configured to suppress vibrations transmitted from a side of the internal combustion engine to a side of the vehicle body, by active vibrations generated by a first actuator of the first engine mount and a second actuator of the second engine mount, comprising:
a central processing unit configured to control the active vibrations generated by the first actuator and the second actuator on basis of rotation information of the internal combustion engine;
wherein the central processing unit:
detects whether an operational state of the internal combustion engine is an all-cylinder operational state in which combustion takes place in all of the cylinders, or a cylinder paused operational state in which combustion is paused in a portion of the cylinders;
executes an amplitude variable—phase fixed control for variably controlling a first amplitude of the active vibrations generated by the first actuator, and a second amplitude of the active vibrations generated by the second actuator, respectively, according to the rotation information, together with fixedly controlling a first phase of the active vibrations generated by the first actuator, and a second phase of the active vibrations generated by the second actuator, respectively, in response to the detection of the all-cylinder operational state; and
executes an amplitude variable—phase variable control for variably controlling the first amplitude and the first phase of the active vibrations generated by the first actuator, and the second amplitude and the second phase of the active vibrations generated by the second actuator, respectively, according to the rotation information, in response to the detection of the cylinder paused operational state.

8. The active vibration damping device according to claim 7, wherein the central processing unit:
detects at least one failure of the first actuator and the second actuator; and
prohibits the amplitude variable—phase variable control, in response to the detection of a failure of the first actuator and/or the second actuator.

* * * * *